June 23, 1936.  E. L. FIX  2,045,130
SAFETY GLASS
Filed Feb. 25, 1936
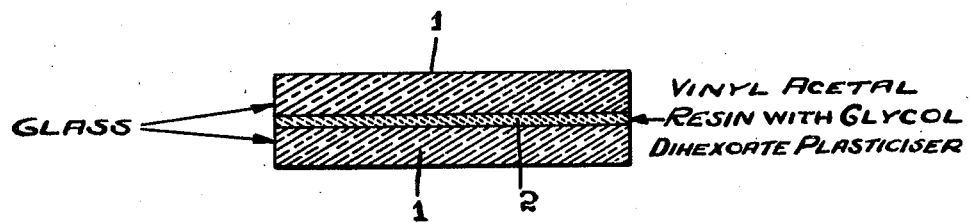
INVENTOR.
EARL L. FIX
BY
ATTORNEYS.

Patented June 23, 1936

2,045,130

UNITED STATES PATENT OFFICE 2,045,130

SAFETY GLASS

Earl L. Fix, New Kensington, Pa., assignor to Pittsburgh Plate Glass Company, a corporation of Pennsylvania Application February 25, 1936, Serial No. 65,599

7 Claims. (Cl. 49—92)

The invention involves an improvement in safety glass which consists of a pair of glass sheets attached to the opposite sides of a sheet of reinforcing of tough non-brittle material, and relates particularly to the use of a reinforcing of the polymerized poly-vinyl acetal resin type, as later described. We have found that the effectiveness of a reinforcing of this composition depends largely on the character and amount of the plasticizer employed, and the present invention has to do primarily with the plasticizer and the amount employed. The objects of the present invention are the provision of an interlayer of the type specified which will adhere tenaciously to the glass under all conditions of service; which will give safety glass of a strength greatly in excess of that in which other types of reinforcing are used, and greatly in excess of that employing the same resin plasticized by the best of the known plasticizers; and which is not subject to let-goes or discoloration at the edges of the laminated plates, even when subject to the most unfavorable weather conditions. One embodiment of the invention is illustrated in the accompanying drawing, wherein:

The figure is a sectional view through the plate.

In the drawing, 1, 1 are sheets of glass and 2 is a sheet or layer of the improved reinforcing, in which the invention particularly resides, the thickness of the sheets of glass and reinforcing being exaggerated and somewhat out of proportion for clearness of illustration.

The interlayer consists of a synthetic resin plasticized in a particular manner, as later explained in detail. The resin used is a polymerized vinyl acetal produced by reacting from 2.5 to 8 mols of poly-vinyl alcohol with 1 mol. of a straight chain (saturated) aliphatic aldehyde, such as butyraldehyde. It is essential that the resin have a considerable portion of poly-vinyl alcohol in excess of the aldehyde used, as the great adhesion of the product to glass is due to the unreacted part of the molecule. However, the ratio of alcohol to aldehyde should not exceed 8 to 1, as a greater excess of alcohol will render the reaction product water soluble. Likewise, if the ratio falls below 2.5 to 1, the reaction product loses its adhesion for the glass. Any of the aliphatic aldehydes may be used in the preparation of these resins. Unsaturated aldehydes, however, do not impart to the product the same desirable characteristics as the saturated aldehydes. An aldehyde containing not more than 6 carbon atoms, such as butyraldehyde is preferred.

While the resin as above described makes a satisfactory reinforcing for safety glass when plasticized with certain of the well known plasticizers, such as diethyl phthalate and dibutyl phthalate, we have discovered that a much superior product for safety glass purposes may be secured by the use of one of the glycol hexoates as plasticizing agents. The glycol may be either the diglycol or triglycol dihexoate, while the hexoate may be either the straight chain C—C—C—C—C—C derivative of hexoic or caproic acid or their isomers of which the following are examples:

Example 1.—Diglycol dihexoate

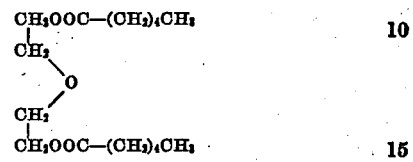

Example 2.—Triglycol dihexoate

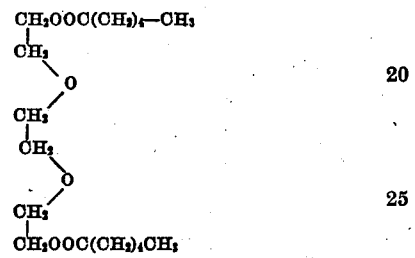

Example 3.—Triglycol dihexoate (triglycol ester of Di isocaproic acid)—an isometric compound of Example 2.

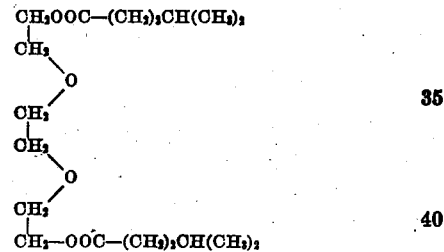

Example 4.—Triglycol dihexoate (triglycol ester of Di 2 Ethyl butyric acid)—an isometric compound of Example 2.

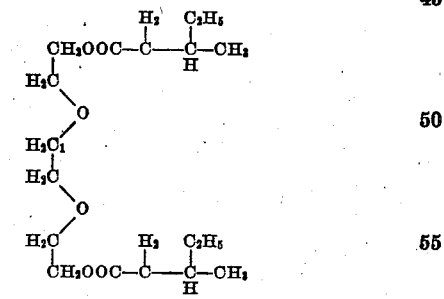

The proportion of resin to plasticizer constitutes a most important factor in the production of a reinforcing which will best meet exacting safety glass requirements as to strength at widely varying temperatures, adhesion, durability, and freedom from moisture attack at the edges of the laminated plates. The following examples show the best proportion for both the triglycol and diglycol dihexoates.

|  | Percent |
|---|---|
| (1) Poly-vinyl acetal resin | 69 |
| Triglycol dihexoate | 31 |
| (2) Poly-vinyl acetal resin | 70 |
| Diglycol dihexoate | 30 |

Laminated glass, with plastic compositions containing less than 25 per cent glycol hexoate, does not give satisfactory break tests at 0 deg. F., while compositions containing more than 45 per cent plasticizer do not give sufficient strength to give satisfactory break tests at 100 to 120 deg. F.

Furthermore, plastic compositions containing 45 per cent plasticizer tend to exude, giving poor adhesions and on exposure the plasticizer volatilizes at the edges of the laminated plates, giving the plates the appearance of plastic shrinkage along such edges. Preferably the proportion of plasticizer will range within 1 or 2 per cent of the specific examples given above, as within such relatively narrow range, the quality of the safety glass produced is very definitely better than in safety glass, in which the plasticizer content lies above or below such range.

The plasticized resin may be formed into sheets in any suitable manner as by extruding the mix under pressure. The laminating operation is preferably similar to that employed in compositing cellulose plastic sheets under Sherts and Hamill Patent No. 1,781,084, except that no cement is required in adhering the resin interlayer to the glass, since the resin becomes strongly adherent on the application of heat and pressure. In laminating, the sheets are first lightly adhered by means of a preliminary press or by passing the sandwiches between nipper rolls, after which the assemblies are placed in an autoclave and exposed to a pressure of about 150 pounds per square inch and a temperature between 175 and 275 deg. F.

The most important advantage of the acetal resin plasticized with a dihexoate, as heretofore described, as a safety glass interlayer, resides in the increased strength of the product through the temperature range to which a car may be subject. This is determined by so-called "break tests", one of which consists in dropping a one-half pound steel ball upon 12"×12" plates. The distance through which the ball falls without breaking through the plate or producing "four piece breaks" is the gauge used in the trade as indicative of the strength of the plate. For instance, a plate which shows as good a break test with a ball drop of four feet as another plate with a ball drop of two feet is referred to as twice as strong. Measured by this standard, safety glass with the improved interlayer is, at 0 deg. F., sixteen times as strong as safety glass using cellulose nitrate or cellulose acetate plastic; at 75 deg. F. it is four times as strong, and at 120 deg. F. it is from one and one-half to two times as strong. The advantage of the improved interlayer, as compared with one consisting of the same resin plasticized by the best of the known plasticizers, such as dimethyl or diethyl phthalate, is also very marked. Safety glass with the improved interlayer is, at 0 deg. F., nearly twice as strong as safety glass using an interlayer of the resin plasticizer with any of the phthalates; at 75 deg. F. it is 25 per cent stronger and at 120 deg. F. it is slightly stronger. It will be apparent from the foregoing that glass employing the improved interlayer involves a wide advance in the art from a safety standpoint and particularly at low temperature, thus overcoming the principal criticism to which safety glass has been subject.

The reason for the superiority of the improved product at varying temperatures, is found in its physical characteristics. While its tensile strength is less than cellulose nitrate and only about the same as cellulose acetate, its elasticity and percentage of elongation before rupture is much greater. As a result the plate when fractured by a blow, bulges, thus distributing the blow over a greater area. Cellulose nitrate has an elongation before rupture of 17 per cent and cellulose nitrate of 40 per cent, while the improved interlayer has an elongation of 330 per cent. Further at low temperatures, the improved interlayer retains its toughness and percentage of elongation in a large degree, whereas, the cellulose plastics become relatively inelastic and brittle.

A further important advantage in the improved interlayer lies in its stability under high temperatures. It will stand a temperature of 260 deg. F. for 120 hours or longer without decomposition, which permits the baking of the enamels on cars after the glass is installed. Cellulose nitrate, under the same conditions, shows decomposition after 40 minutes and the vinyl acetal resin plasticized with diethyl phthalate shows bubbling after 45 minutes at 260 deg. F.

A further advantage in the improved product over safety glass employing cellulose acetate or nitrate plastic, as an interlayer, resides in its resistance to humidity. Samples of unsealed safety glass using the nitrate or acetate plastic, when exposed for two weeks to a relative humidity of 100 per cent and a temperature 120 deg. F., shows 1/8" to 1/4" separation on all edges, while samples using the improved interlayer show no edge separation when similarly exposed.

What I claim is:

1. A laminated plate comprising a pair of glass sheets adhered to the opposite sides of a sheet of a polymerized incomplete poly-vinyl acetal resin mixed with a glycol dihexoate as a plasticizer, said plasticizer constituting 25 to 45 per cent of the mixture of resin and plasticizer.

2. A laminated plate comprising a pair of glass sheets adhered to the opposite sides of a sheet of a polymerized incomplete poly-vinyl acetal resin mixed with diglycol dihexoate as a plasticizer, said plasticizer constituting about 30 per cent of the mixture of the resin and plasticizer.

3. A laminated plate comprising a pair of glass sheets adhered to the opposite sides of a sheet of a polymerized incomplete poly-vinyl acetal resin mixed with triglycol dihexoate as a plasticizer, said plasticizer constituting about 31 per cent of the mixture of resin and plasticizer.

4. A laminated plate comprising a pair of glass sheets adhered to the opposite sides of a sheet of a polymerized incomplete poly-vinyl acetal resin obtained by reacting from 2½ to 8 mols of poly-vinyl alcohol with 1 mol. of a saturated aliphatic aldehyde, said resin being plasticized with a glycol dihexoate in which the glycol dihexoate constitutes from 25 to 45 per cent of the mixture of resin and plasticizer.

5. A laminated plate comprising a pair of glass sheets adhered to the opposite sides of a sheet of a polymerized incomplete poly-vinyl acetal resin obtained by reacting from 2½ to 8 mols of poly-vinyl alcohol with 1 mol. of a saturated aliphatic aldehyde, said resin being plasticized with a glycol dihexoate in which the glycol dihexoate constitutes about 30 per cent of the mixture of resin and plasticizer.

6. A laminated plate comprising a pair of glass sheets adhered to the opposite sides of a sheet of a polymerized incomplete poly-vinyl acetal resin obtained by reacting from 2½ to 4 mols of poly-vinyl alcohol with 1 mol. of butyraldehyde, said resin being plasticized with a glycol dihexoate in which the glycol dihexoate constitutes about 30 per cent of the mixture of resin and plasticizer.

7. A laminated plate comprising a pair of glass sheets adhered to the opposite sides of a sheet of a polymerized incomplete poly-vinyl acetal resin obtained by reacting from 2½ to 8 mols of poly-vinyl alcohol with 1 mol. of a saturated aliphatic aldehyde, containing 2 to 6 carbon atoms, said resin being plasticized with a glycol dihexoate in which the glycol dihexoate constitutes about 30 per cent of the mixture of resin and plasticizer.

EARL L. FIX.